(12) United States Patent
Boroditsky et al.

(10) Patent No.: US 7,773,207 B1
(45) Date of Patent: *Aug. 10, 2010

(54) ESTIMATING OPTICAL TRANSMISSION SYSTEM PENALTIES INDUCED BY POLARIZATION MODE DISPERSION (PMD)

(75) Inventors: Mikhail Boroditsky, South Amboy, NJ (US); Mikhail Brodsky, Millburn, NJ (US); Nicholas J. Frigo, Annapolis, MD (US); Peter Magill, Freehold, NJ (US)

(73) Assignee: AT&T Corp., New York, NY (US)

( * ) Notice: Subject to any disclaimer, the term of this patent is extended or adjusted under 35 U.S.C. 154(b) by 36 days.

This patent is subject to a terminal disclaimer.

(21) Appl. No.: 12/228,990

(22) Filed: Aug. 19, 2008

Related U.S. Application Data

(63) Continuation of application No. 11/827,764, filed on Jul. 13, 2007, now Pat. No. 7,414,711, which is a continuation of application No. 11/255,028, filed on Oct. 20, 2005, now Pat. No. 7,256,876.

(60) Provisional application No. 60/699,107, filed on Jul. 14, 2005.

(51) Int. Cl.
*G01N 21/00* (2006.01)
(52) U.S. Cl. ..................................... 356/73.1
(58) Field of Classification Search .................. None
See application file for complete search history.

(56) References Cited

U.S. PATENT DOCUMENTS 7,256,876 B1 * 8/2007 Boroditsky et al. ........ 356/73.1
2004/0071381 A1 * 4/2004 Szafraniec et al. ............ 385/11

* cited by examiner

*Primary Examiner*—Tu T Nguyen

(57) ABSTRACT

Polarization mode dispersion (PMD) induced system penalty $\epsilon$ is determined from optical characteristics of an optical wavelength division multiplexed (WDM) signal that is carried on a network. The method involves tapping the optical WDM signal, separating an optical channel from the tapped optical WDM signal, performing a frequency-resolved state of polarization (SOP) measurement on the channel, and computing the PMD-induced system penalty as $\epsilon = AL^2 + BL^4$, in which A and B are predetermined parameters and L is an SOP string length based on the SOP measurement.

8 Claims, 4 Drawing Sheets

ESTIMATING OPTICAL TRANSMISSION SYSTEM PENALTIES INDUCED BY POLARIZATION MODE DISPERSION (PMD)

CROSS-REFERENCE TO RELATED APPLICATION

This application is a continuation application of U.S. patent application Ser. No. 11/827,764, filed Jul. 13, 2007, now U.S. Pat. No. 7,414,711, issued Aug. 19, 2008, which is a continuation of U.S. patent application Ser. No. 11/255,028, filed Oct. 20, 2005, now U.S. Pat. No. 7,256,876 issued Aug. 14, 2007, which claims priority to U.S. provisional application 60/699,107, filed Jul. 14, 2005, all of which are incorporated herein by reference in their entirety.

This application may be considered to be related to U.S. application Ser. No. 10/825,529, filed Apr. 15, 2004, entitled Method and Apparatus for Measuring Frequency-Resolved States of Polarization of a Working Optical Channel Using Polarization-Scrambled Heterodyning, now U.S. Pat. No. 7,174,107 issued Feb. 6, 2007, and having common inventorship and ownership with the present patent application. This patent application is incorporated herein by reference.

BACKGROUND

1. Field of the Invention

This invention relates to arrangements for measuring polarization mode dispersion (PMD) in optical communication fibers. More specifically, the invention relates to arrangements for determining which portion of fiber communication system penalty is induced by first-order and all-order PMD.

2. Background Art

Optical fiber communications systems are subject to system penalties that derive from a variety of sources, only one of which is polarization mode dispersion (PMD). Other sources that can degrade system performance include, for example, chromatic dispersion, multi-path interference and nonlinear effects.

When a fiber's performance has been inadequate or failing, conventional systems have not been able to readily isolate the causes of any performance degradation, or measure the relative contributions of the degradation sources. It has sometimes been necessary to bring a system offline in order to perform experiments that can isolate the cause of a problem. This inability to readily diagnose the problem source(s) has thwarted predictions of system performance and prevented efficient and focused attempts to correct performance problems.

Thus, there is a need in the art to readily monitor and evaluate PMD-induced effects in optical transmission systems, to allow system outages to be predicted, corrected or prevented.

REFERENCES

Ref. 1. M. Shtaif, M. Boroditsky, "The effect of the frequency dependence of PMD on the performance of optical communications systems", *Photon. Technol. Lett.*, 15(10) pp. 1369-1371, 2003.

Ref. 2. P. J. Winzer, H. Kogelnik, C. H. Kim, H. Kim, R. M. Jopson, L. E. Nelson, and K. Ramanan, "Receiver impact on first-order PMD outage," *Photon. Technol. Lett.*, 15, pp. 1482-4, 2003.

Ref. 3. H. Kogelnik, R. M. Jopson, L. E. Nelson, "Polarization Mode Dispersion," in *Optical Fiber Communications*, I. Kaminow, Ed, Vol. IVb, San Diego, Academic Press, (2002), pp. 745-762.

Ref. 4. Boroditsky et al., "Viewing polarization 'strings' on working channels: High-resolution heterodyne polarimetry," *Proc ECOC* 2004, Paper We5.4.5.

Ref. 5. L. E. Nelson, R. M. Jopson, H. Kogelnik, G. J. Foschini, "Measurement of depolarization and scaling associated with second-order polarization mode dispersion in optical fibers," *IEEE Photon. Technology Letters*, 11 (12) pp. 1614-1616, 1999.

Ref. 6. P. Westbrook et al., "Wavelength sensitive polarimeter for multichannel polarization and PMD monitoring," in *Proc. OFC* 2002, paper WK5.

Ref. 7. S. X. Wang, A. M. Weiner "Fast wavelength-parallel polarimeter for broadband optical networks," *Optics Lett.*, 29, pp 932-925, 2004.

Ref. 8. C. Antonelli et al., "PMD-induced penalty statistics fiber links," *IEEE Photon. Technology Letters*, 17(5), pp 1013-1015, May 2005.

All references, including patents and patent applications, cited in this specification are incorporated herein by reference.

SUMMARY

A method determines polarization mode dispersion (PMD) induced system penalty $\epsilon$ from optical characteristics of an optical wavelength division multiplexed (WDM) signal carried on a network. The method involves tapping the optical WDM signal, separating an optical channel from the tapped optical WDM signal, performing a frequency-resolved state of polarization (SOP) measurement on the channel, and computing the PMD-induced system penalty as $\epsilon = AL^2 + BL^4$, in which A and B are predetermined parameters and L is an SOP string length based on the SOP measurement.

BRIEF DESCRIPTION OF THE DRAWINGS

A more complete appreciation of the described embodiments is better understood by reference to the following Detailed Description considered in connection with the accompanying drawings, in which like reference numerals refer to identical or corresponding parts throughout, and in which.

DETAILED DESCRIPTION

Figure 1:
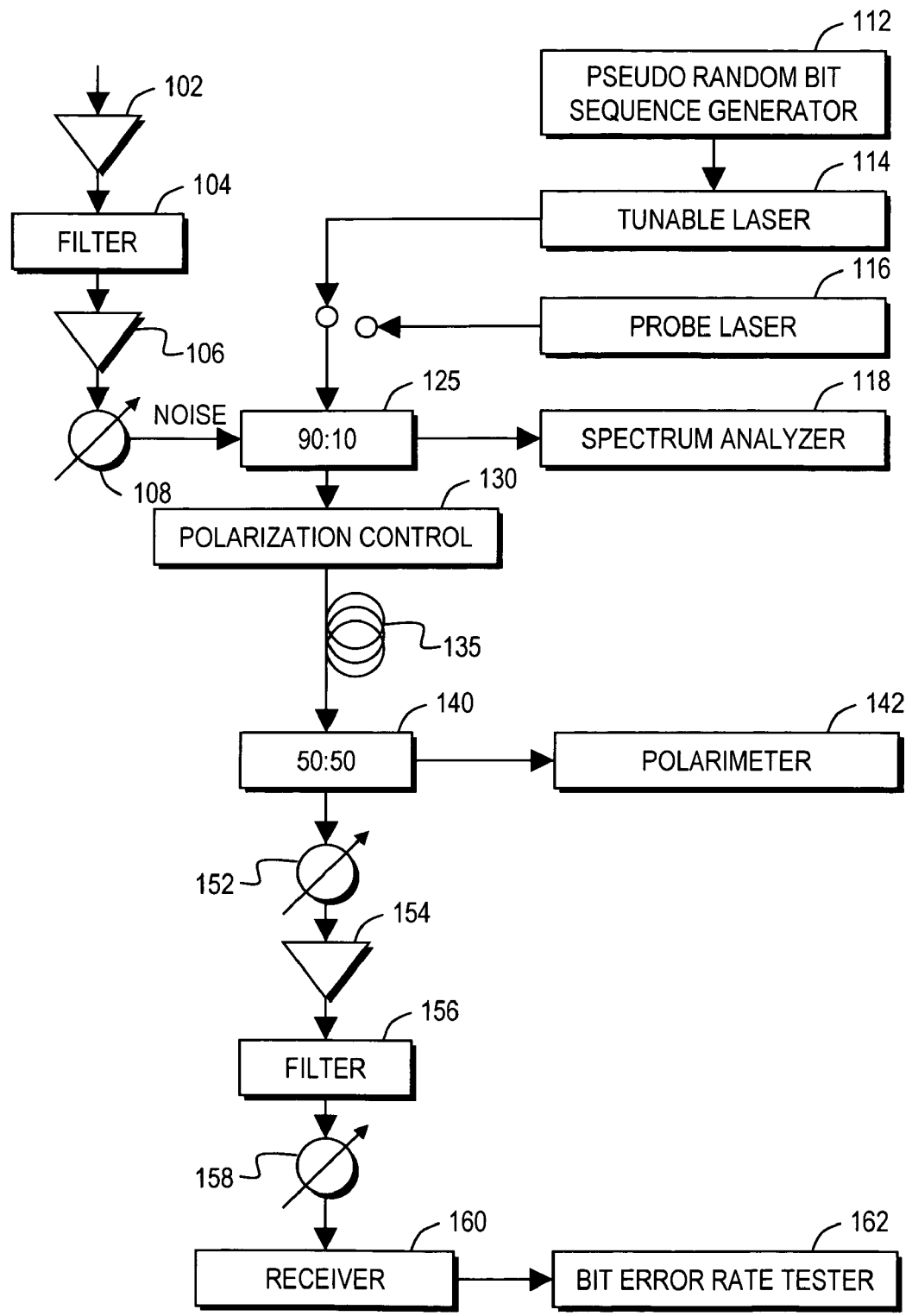
FIG. 1 shows an experimental setup to measure the optical signal-to-noise ratio (OSNR), bit error rate (BER), state of polarization (SOP) and polarization mode dispersion (PMD) in rapid sequence.

In describing embodiments illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. Various terms that are used in this specification are to be given their broadest reasonable interpretation when used to interpret the claims.

Moreover, features and procedures whose implementations are well known to those skilled in the art are omitted for brevity. For example, initiation and termination of loops, and the corresponding incrementing and testing of loop variables, may be only briefly mentioned or illustrated, their details being easily surmised by skilled artisans. Thus, the steps involved in methods described herein may be readily implemented by those skilled in the art without undue experimentation.

Further, various aspects, features and embodiments may be described as a process that can be depicted as a flowchart, a flow diagram, a structure diagram, or a block diagram. Although a flowchart may describe the operations as a sequential process, many of the operations can be performed in parallel, concurrently, or in a different order than that described. Operations not needed or desired for a particular implementation may be omitted. A process or steps thereof may correspond to a method, a function, a procedure, a subroutine, a subprogram, and so forth, or any combination thereof.

The invention provides arrangements to measure system degradation that is induced by polarization mode dispersion (PMD), and to separate it from other impairment sources. That is, the invention permits one to determine if errors in a network are due to PMD or some other fault such as fiber loss, failing amplifiers, and so on.

One method involves spectrally separating a portion of the signal of interest, measuring frequency-resolved state of polarization of said modulated signal, and calculating the system penalty (such as eye-closure penalty or OSNR penalty) from the measurement. The measurement result can be used either as a channel quality estimate or as a feedback signal for channel PMD mitigation.

Both experimentally and numerically, a correlation has been established between PMD-induced system degradation, characterized by eye penalty or OSNR penalty, and the measurable frequency resolved output state of polarization of the operation optical channel. One embodiment of a method operates "in-service", that is without need to interrupt the service.

The method uses a novel signal characteristic that is correlated with system performance against a random, time-varying impairment. Experiments have measured the PMD-induced system penalty arising from first-order and all-order PMD. A measurable quantity, herein referred to as "string" length, parameterizes the penalty. It finds a deterministic correction to the accepted first-order PMD-induced system penalty approximation. Higher orders of PMD are shown to introduce an additional penalty scatter that is nearly independent of "string" length, and correlated to the magnitude of the second order PMD vector.

Polarization-mode dispersion has the potential to become a significant limiting factor in high speed optical communication systems. Thus, a detailed understanding of PMD statistics, dynamics, and resulting system impairments are important for successful implementation of mitigation techniques (see, for example, references 1, 2). Since a system's PMD tolerance is related to many parameters, including the modulation format and receiver design, PMD-induced system impairments are often approximated. Commonly, only the first order effect of PMD is considered. The present arrangement measures PMD-induced system penalty from not only first order effect of PMD but also that of all-order effect of PMD.

PMD can be characterized by the PMD vector $\vec{\tau}(\omega)$, which may be expanded into a Taylor series about the signal's center frequency (see, for example, reference 3). The first term of the expansion, known as first order PMD, is the differential group delay (DGD) between the two principal states of polarization (PSPs). Since this delay is considered to be the dominant mechanism for PMD induced system impairment, the penalty has been related to the power in each of the PSPs and the DGD (see, for example, reference 3). However, this model does not consider the effects of higher-order PMD. The inventors have realized that the first-order PMD-induced system penalty can be represented by a measurable channel characteristic, a state of polarization (SOP) 'string', which is the length of a curve on the Poincaré sphere traced by the output SOP as the frequency sweeps across the modulation bandwidth (see, for example, reference 4). Using a first order approximation for this model, the PMD-induced power penalty arising from purely first order PMD sources was compared with that from a fiber with all orders of PMD present. It was found that a deterministic correction should be made to the first-order PMD-induced penalty approximation for both first and all-order PMD. Further, it was shown that higher orders of PMD introduce an additional scatter that is correlated with the magnitude of the second order PMD vector and nearly independent of the length of the SOP string.

To characterize the relationship between PMD and system performance, the OSNR penalties were measured for three different PMD sources. Two were first-order PMD sources comprising polarization maintaining (PM) fibers with DGDs of 26 ps and 60 ps, and lengths of 100 m and 60 m, respectively. The third was an all-order PMD source comprising 12 km of mechanically and thermally stabilized high PMD fiber compensated for chromatic dispersion. Its DGD had a mean of 30.8 ps, and ranged between 10.9 ps and 52.5 ps over the frequencies of interest.

The system penalty was characterized by measuring the change in OSNR, relative to a back-to-back measurement, required to maintain a constant BER of $10^{-9}$. The experimental setup shown in FIG. 1 uses a tunable laser 114 with an integrated zero-chirp 15 dB extinction ratio modulator to generate a single optical channel transmitting a $2^{23}$-1 non-return-to-zero (NRZ) pseudo-random bit sequence (PRBS generator element 112) at 10 Gb/s.

Figure 2:
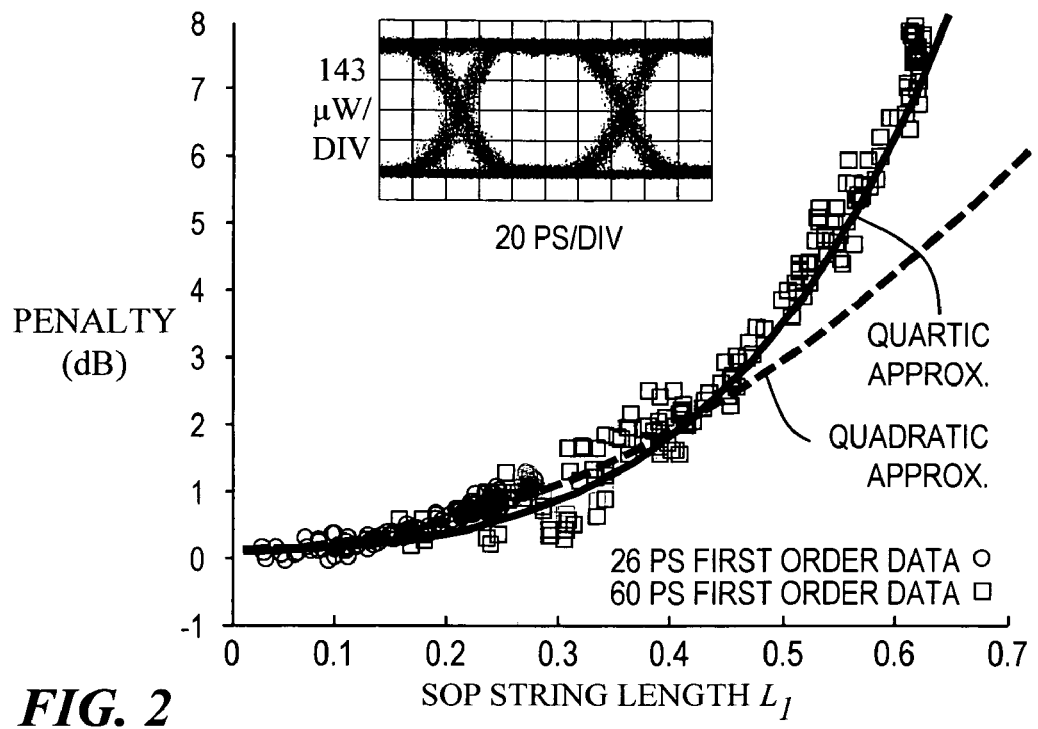
FIG. 2 shows first order PMD data for differential group delays (DGDs) of 26 ps (circles) and 60 ps (squares), with respective quadratic and quartic fits, the inset showing an optical eye for a back-to-back measurement.

The optical eye for a back-to-back measurement is shown in the inset of FIG. 2. The OSNR was controlled by combining the signal in a 90:10 coupler 125 (FIG. 1) with a depolarized amplified spontaneous emission (ASE) noise source. The noise was generated by a first erbium-doped fiber amplifier (EDFA) 102 with open input to generate amplified spontaneous emission, essentially an optical version of white noise. First EDFA 102 is followed by a tunable 1.2 nm grating filter 104 centered on the signal wavelength, followed by a second EDFA 106. ASE loading was controlled with an optical attenuator 108 positioned between EDFA 106 and coupler 125.

At one output of coupler 125, the input SOP was set using a polarization controller 130 before launching both the signal and ASE noise into the PMD source 135. This fixes the signal polarization relative to any residual polarization of ASE noise, resulting from the weak polarization dependence of the grating filter. The other output of coupler 125 was connected to an optical spectrum analyzer (OSA) used for OSNR measurements.

At the output of the PMD source 135, the signal is passed into a 3 dB coupler 140. One coupler output was connected to a monitoring polarimeter 142. The other coupler output was passed through an attenuator 152, EDFA, 154, filter 156, attenuator 158, to an optically pre-amplified OC-192 receiver 160. Receiver 160 has a 0.25 nm optical filter, and is connected to a bit error rate (BER) tester. Results were collected from forty-one frequency channels at 50 GHz spacing on the ITU grid between 193.0 to 195.0 THz.

For each channel, PMD measurements were initially taken across a 40 GHz frequency band centered at the channel's optical frequency, using the tunable probe laser, polarization controller and polarimeter. The DGD and PSP for each channel were determined from this data using the Müller Matrix Method (see, for example, reference 5). Data was then transmitted over the channel using the modulated tunable laser. The data signal's launch SOP was rotated through 20 preprogrammed states that gave uniform coverage of the Poincaré sphere.

For each launch SOP, the ASE loading was adjusted in 1 dB steps to produce OSNRs of between 15 and 25 dB; the decision timing and threshold of the BER decision circuit were optimized; and the BER and OSNR were recorded. Finally, the PMD measurement across the same 40 GHz bandwidth was repeated to estimate the stability of the channel's PMD vector throughout the duration of the measurements, before moving to the next channel. Since the same polarimeter was used to measure the PSP of the PMD source and the signal's SOP, it is possible to calculate the angle between these two measured vectors. The back-to-back OSNR for each channel varied between 20.1 and 20.6 dB, with the variation attributed to the polarization dependence of the OSA and optical filters.

The PMD-induced OSNR penalty is often approximated to the first order by the following empirical expression (see, for example, reference 3):

$$\varepsilon(\vec{\tau}) = A_0 \gamma (1-\gamma) \left(\frac{\tau}{T}\right)^2 \quad (1)$$

in which:

$\varepsilon$ is the PMD-induced OSNR penalty;

$\vec{\tau}$ is the PMD vector at the input;

$A_0$ is a modulation-format-specific constant;

$\gamma$ is the splitting ratio between the two PSPs;

$\tau$ is differential group delay (DGD); and

T is the bit period.

Eq. 1 can be rewritten in terms of the length of an SOP trace on the Poincaré sphere as the frequency moves across the modulation bandwidth 1/T. This 'string' is a measurable quantity, which represents the depolarization of a signal, and can be separated from other impairments affecting the signal performance (see, for example, references 4, 6, 7). The first order approximation for this string length is given by:

$$L_1 = (\tau/T)\sin\theta$$

in which $\theta$ is the angle between the PSP and the launch SOP. With this notation, Eq. (1) can be rewritten to show that the penalty $\varepsilon$ is related to the string length $L_1$ through a quadratic relationship:

$$\varepsilon = \frac{A_0}{4} L_1^2 \quad (2)$$

Since string length $L_1$ can be determined either directly from spectrally resolved polarimetry, or by measuring $\theta$ and $\tau$, the applicability of Eq. 2 to pure first order and to higher order PMD may be investigated by plotting the OSNR penalties at BER=$10^{-9}$ against the corresponding string length approximation $L_1$. FIG. 2 compares the results for the two first order PMD fibers, with DGDs of 26 ps and 60 ps. The coefficient in Eq. 2 was extracted from the lower bound of the 26 ps data and found $A_0$=49.6, which is remarkably close to the $A_0$=48.3 reported in reference 2 for NRZ modulation. The corresponding penalty from Eq. (2) is shown as a dashed line. While the fit is good at small string lengths, the 60 ps results at higher string lengths show a strong deviation. Instead, this data is well fitted by the quartic polynomial:

$$\varepsilon = AL_1^2/4 + BL_1^4 \quad (3)$$

The quartic polynomial includes a higher order term, and is similar to that in other publications (see, for example, reference 2). In our case, the best fit for the lower bound is obtained with A=40 and B=36. While Eq. 3 is not the only form a correction to the first order penalty approximation could take, it is a convenient choice as it lends itself to analytical analysis of PMD outages (see, for example, reference 8). For example, if the DGD follows a Maxwellian distribution then the system outage probability (that is, the probability of the penalty to exceed $\varepsilon_{out}$ dB) becomes:

$$P_{out} = \exp(\upsilon - \upsilon\sqrt{1+\varepsilon_{out}/\eta}) \quad (4)$$

in which:

$P_{out}$ is the system outage penalty;

$\upsilon = 3A/(16Br^2)$;

$r = \tau_{rms}/T$ is the ratio between the rms DGD and the bit period;

$\eta = A^2/(64B)$; and $\varepsilon_{out}$ is the maximum optical signal-to-noise ratio (OSNR) penalty a system can tolerate before going into outage.

Figure 3:
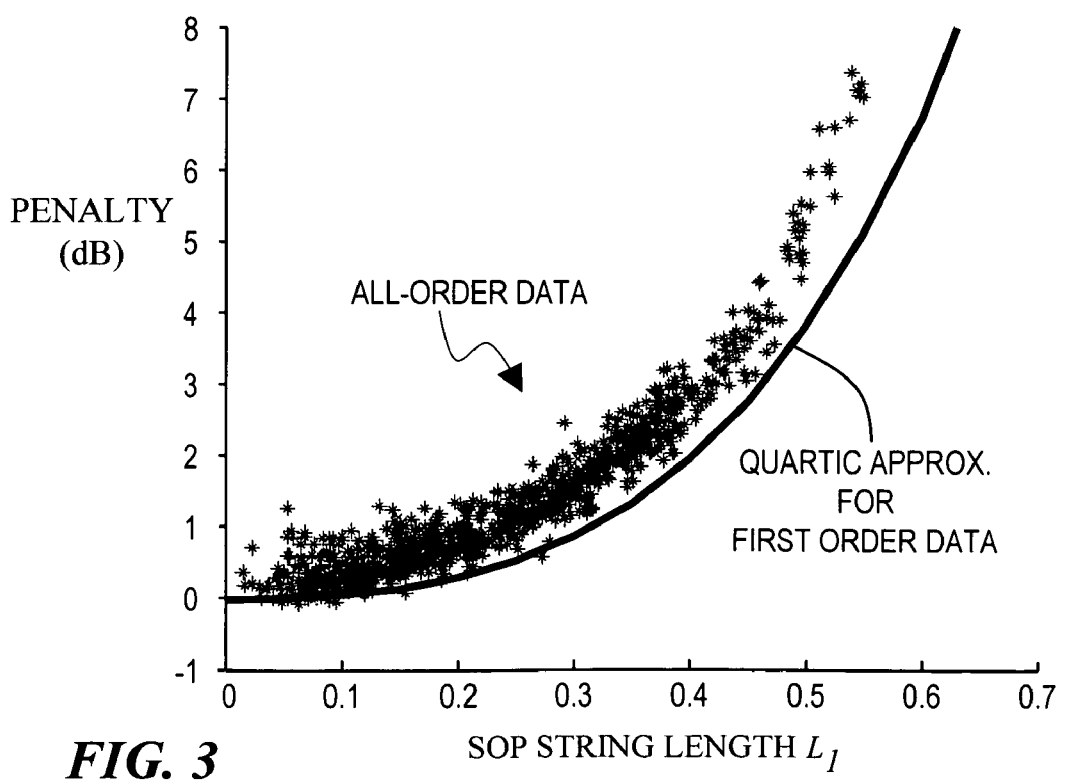
FIG. 3 illustrates all-order PMD data, with a lower bound provided by a quartic approximation for the first order data of FIG. 2.

The applicability of Eq. (3) to the all-order PMD fiber data is shown in FIG. 3. It is clear that (i) the quartic fit for the first-order data serves as a lower bound for the all-order data, and (ii) the penalty scatter is considerably higher for the all-order data, exceeding the experimental error of 0.5 dB in OSNR measurement.

Figure 4:
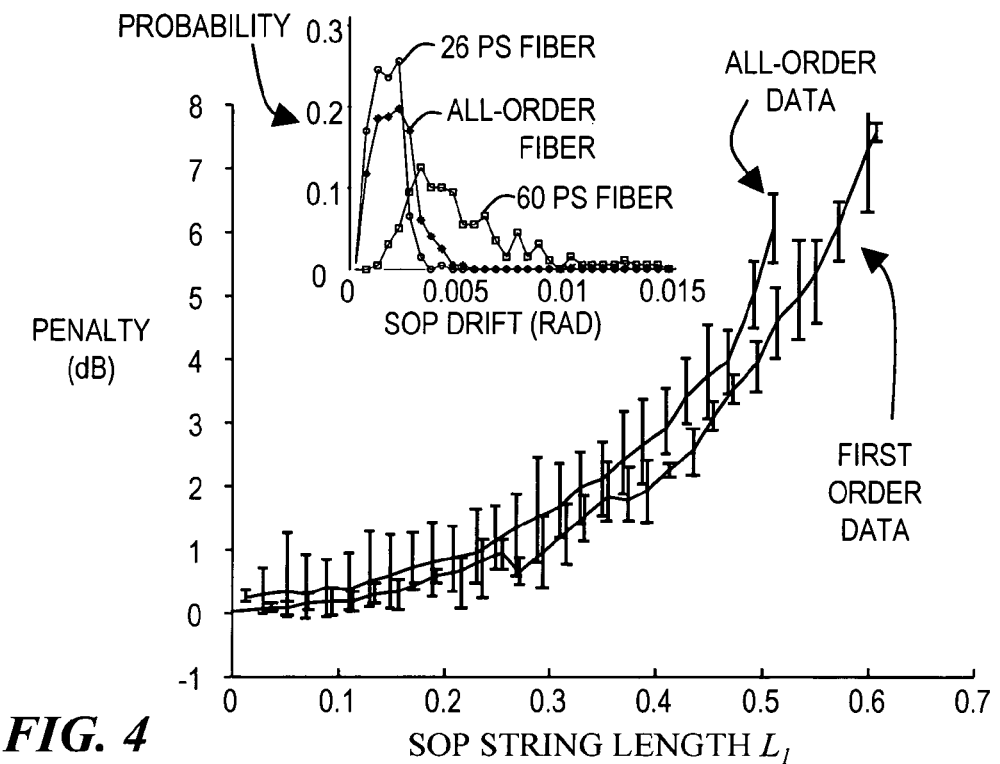
FIG. 4 shows mean penalty value vs. SOP string length for first order and all-order PMD fibers, the range of penalty values being shown by error bars and the inset comparing the SOP drift for the three PMDs.

To evaluate the data further, the OSNR penalty data was sorted into SOP string length bins of width 0.02. FIG. 4 shows the mean and range of penalty values in each bin. The figure reveals another interesting feature of the data: the penalty scatter is approximately constant for the all-order PMD data, but appears to increase with string length for the first order data, particularly for higher values. To find the cause, a comparison was made of the stability of the three fibers using the rms drift of the received SOP over the measurement time for each launch SOP and channel investigated. The inset of FIG. 4 compares the distribution of these drifts for the three fibers and shows that the 60 ps high birefringence fiber has greater SOP drift, which accounts for the increased spread of the first order data at higher string lengths.

Figure 5:
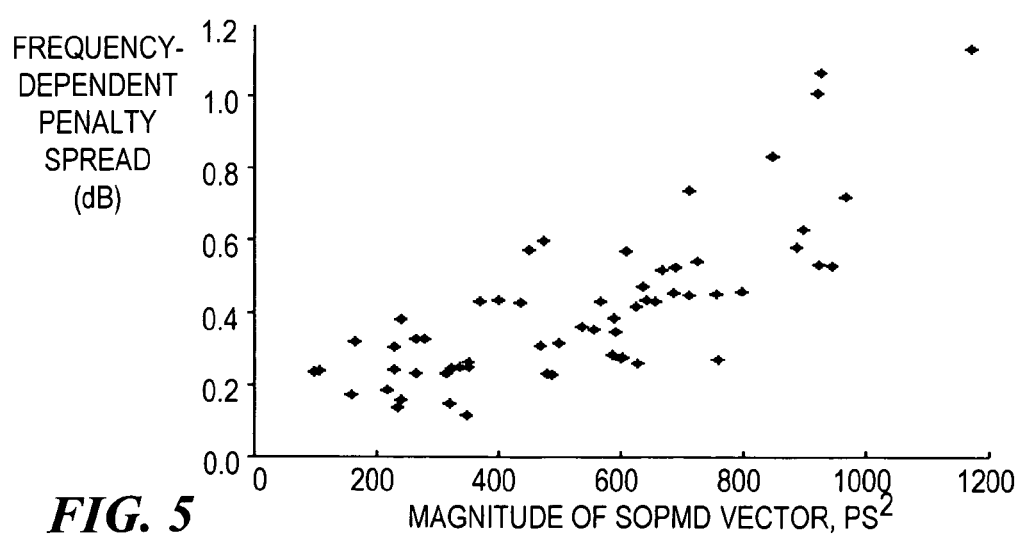
FIG. 5 shows penalty spread vs. magnitude of the second order PMD vector.

Since the approximation for string length used here, neglects the effect high-order PMD, the additional spread of the all-order data was attributed to higher orders of PMD. To study this, FIG. 5 plots the penalty spread of the all-order PMD data from each channel against the magnitude of its second order PMD vector. The figure shows that the penalty spread increases with the magnitude of the second order PMD. A linear fit gives a correlation coefficient of $R^2=0.77$. However, the experimental results indicate that Eq. 3 adequately describes the relationship between the system penalty and string length despite this additional scatter.

It may be concluded that the empirical quadratic approximation for PMD-induced OSNR penalty holds for a purely first order PMD source with small DGDs. However, larger DGDs, and the presence of high-order PMD increases the penalty, which follows a quartic dependence on 'string' length. The first order data acts as a lower bound for the all-order data, whose additional scatter is attributed to higher orders of PMD. The amount of higher-order penalty scatter is nearly independent of the 'string' length, and can be correlated with the magnitude of the second order PMD vector. Further, the string approach is shown to be a good predictor of the OSNR penalty.

Figure 6:
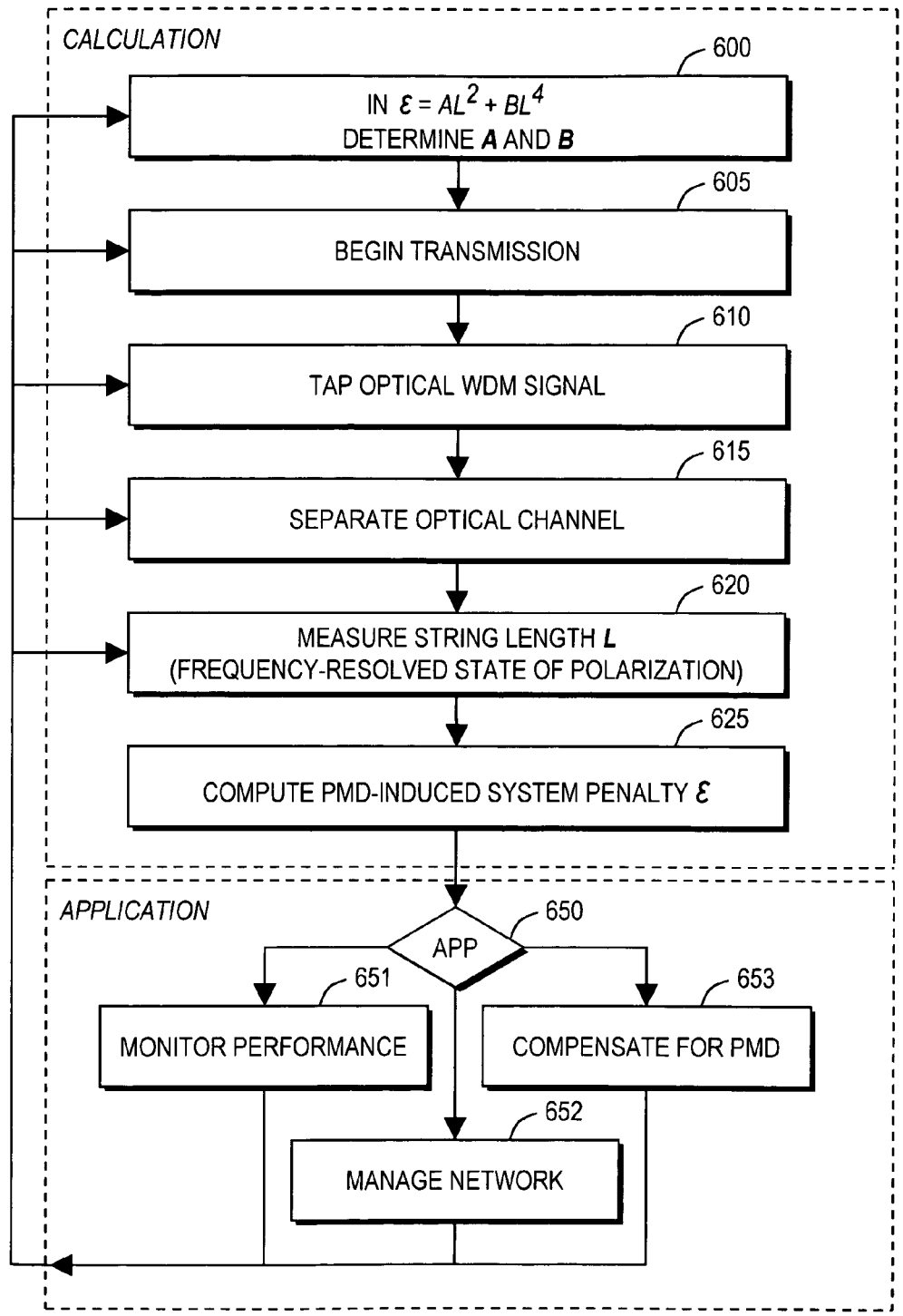
FIG. 6 is a flowchart of one practical embodiment of a method of determining the polarization mode dispersion (PMD) induced system penalty $\epsilon$ of an optical transmission system.

FIG. 6 is a flowchart of one practical embodiment of a method of determining the polarization mode dispersion (PMD) induced system penalty ϵ of an optical transmission system. The illustrated method involves a first portion in which the system penalty is calculated, and a second portion in which the calculated system penalty is used in some useful application.

One embodiment is based on the calculation of the system penalty based generally on Eq. 3, above, which may be simplified as:

$$\epsilon = AL^2 + BL^4 \quad (5)$$

in which:
A and B are predetermined parameters that may be constants, and
L is an SOP string length.

Referring again to FIG. 6, block 600 indicates the calculation of parameters A and B for a particular system. In one embodiment, A and B are constants. A and B depend on the designs of the transmitter and receiver, and may be calculated in advance by fitting the measured penalty against string length data with Eq. 5.

Block 605 indicates beginning of transmission on the optical fiber in question.

Block 610 indicates the tapping of an optical wavelength division multiplexed (WDM) signal from the fiber. In one embodiment, this tapping is performed by an optical coupler.

Block 615 indicates the separating of an optical channel of interest from the optical WDM signal that was tapped in block 610. In one embodiment, this separating step is performed using an optical bandpass filter.

It is readily appreciated by those skilled in the art that the order of blocks 610 and 615, like others described in this disclosure, may be reversed.

Block 620 indicates the measurement of string length L. String length is obtained from a frequency-resolved state of polarization (SOP) measurement by calculating the length of a state of polarization trace. In one implementation, this length is spectrally weighted. Frequency resolved SOP measurement may be performed by optically resolved polarimetry (see, for example, reference 7). Alternatively, string measurement may be performed using heterodyne polarimetry (see, for example, reference 4, and co-pending U.S. application Ser. No. 10/825,529, filed Apr. 15, 2004, entitled Method and Apparatus for Measuring Frequency-Resolved States of Polarization of a Working Optical Channel Using Polarization-Scrambled Heterodyning, which is incorporated herein by reference).

Those skilled in the art may perform string measurement without undue experimentation (see, for example, references 4, 6, 7). In one embodiment, string measurement is computed according to a formula:

$$L = \frac{\int I(\omega)|dS/d\omega|d\omega}{T\int I(\omega)d\omega} \quad (6)$$

in which:
I(ω) is a weighting function such as an optical spectrum density function;
ω is frequency;
S(ω) is the frequency-resolved state of polarization (SOP); and
T is a bit period.

Given a value of L, block 625 indicates computation of the polarization mode dispersion (PMD) induced system penalty ϵ. In one embodiment, ϵ is computed according to Eq. 5, above, and as shown in block 600.

As an enhancement, to include the effect of higher orders, another string length parameter may be used that is more generally defined as a "functional" (a function of a function) F[ ]:

$$L = F[\vec{S}(\omega)] \quad (7)$$

In Eq. 7, F[ ] is a functional (here a scalar function of a vector function) that minimizes the scatter in FIG. 4 (a graph of PMD-induced system penalty as a function of SOP string length $L_1$). In one implementation, this functional is chosen to include not only the string length but also the string curvature as:

$$L = \frac{\int I(\omega)|dS/d\omega|d\omega}{T\int I(\omega)d\omega} + \alpha \frac{\int I(\omega)|d^2S/d\omega^2|d\omega}{T^2\int I(\omega)d\omega} \quad (8)$$

in which α is a constant depending on the modulation format and design of the transmitter and receiver.

The PMD-induced system penalty ϵ, once calculated, may be used in a variety of ways. The manner in which ϵ is used, depends on the particular application. Block 650 indicates a choice of application of the calculated ϵ:

Block 651 indicates a first application of ϵ, which is to monitor performance of the optical network of which the optical fiber in question is a part.

Block 652 indicates a second application of ϵ, which is to manage the network of which the optical fiber in question is a part.

Block 653 indicates a third application of ϵ, which is to actually feed back the value of ϵ to a compensator element in order to affirmatively compensate for or mitigate the degradation that PMD has caused. Given the calculated value of ϵ, this compensation or mitigation may be readily implemented by those skilled in the art.

Of course, the illustrated applications 651, 652, 653 are examples and do not limit the scope of application of the invention.

After the system penalty is calculated and any application of the calculated penalty has been carried out, control may return to any of a variety of blocks in FIG. 6. For example, control may return to block 600 for a re-calculation of A and B for the same or a different system. Alternatively, control may return to block 605 to begin transmission of new or different data, to block 610 to tap the same or a different optical SDM signal, to block 615 to separate the same or a different channel of interest, or to block 620 to measure string length L again.

The calculations involved in computing the PMD-induced system penalty and in other monitoring and control steps, may be performed by a suitable general purpose computer or processor arrangement.

In one embodiment, the apparatus is a computer or a cluster of computers, powered by software to execute the functionality described herein. The functional elements described above may be embodied by any suitable systems for performing the described methods, the systems including at least one data processing element. Generally, these data processing elements may be implemented as any appropriate computer(s) employing technology known by those skilled in the art to be appropriate to the functions performed. The computer(s) may be implemented using a conventional general purpose computer programmed according to the foregoing teachings, as will be apparent to those skilled in the computer art. Appropriate software can readily be prepared by programmers based on the teachings of the present disclosure. Suitable programming languages operating with available operating systems may be chosen.

General purpose computers may implement the foregoing methods, in which the computer housing may house a CPU (central processing unit), memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other special purpose logic devices such as ASICs (application specific integrated circuits) or configurable logic devices such GAL (generic array logic) and reprogrammable FPGAs (field programmable gate arrays).

Each computer may also include plural input devices (for example, keyboard, microphone, and mouse), and a display controller for controlling a monitor. Additionally, the computer may include a floppy disk drive; other removable media devices (for example, compact disc, tape, and removable magneto optical media); and a hard disk or other fixed high-density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

The invention envisions at least one computer readable medium. Examples of computer readable media include compact discs, hard disks, floppy disks, tape, magneto optical disks, PROMs (for example, EPROM, EEPROM, Flash EPROM), DRAM, SRAM, SDRAM. Stored on any one or on a combination of computer readable media is software for controlling both the hardware of the computer and for enabling the computer to interact with other elements, to perform the functions described above. Such software may include, but is not limited to, user applications, device drivers, operating systems, development tools, and so forth. Such computer readable media further include a computer program product including computer executable code or computer executable instructions that, when executed, causes a computer to perform the methods disclosed above. The computer code may be any interpreted or executable code, including but not limited to scripts, interpreters, dynamic link libraries, Java classes, complete executable programs, and the like.

From the foregoing, it will be apparent to those skilled in the art that a variety of methods, systems, computer programs on recording media, and the like, are provided.

The present disclosure supports a method for determining a polarization mode dispersion (PMD) induced system penalty ϵ from the optical characteristics of an optical wavelength division multiplexed (WDM) signal carried on a network. The method involves tapping the optical WDM signal, separating an optical channel from the tapped optical WDM signal, performing a frequency-resolved state of polarization (SOP) measurement on the channel, and computing the PMD-induced system penalty as $\epsilon = AL^2 + BL^4$ in which A and B are predetermined parameters and L is an SOP string length based on the SOP measurement.

The step of performing a frequency-resolved SOP measurement may include performing a string length measurement by a frequency-resolved SOP optical-domain measurement.

The string length measurement may include performing the string length measurement using heterodyne polarimetry.

The method may also involve demultiplexing the optical WDM signal before the signal tapping step.

The method may also involve performing monitoring and network management using the computed PMD-induced system penalty ϵ.

The method may also involve compensating for or mitigating the polarization mode dispersion by feeding the computed PMD-induced system penalty ϵ back to a PMD compensation arrangement.

L may be a weighted string length expressed as:

$$L = \frac{\int I(\omega)|dS/d\omega|d\omega}{T\int I(\omega)d\omega}$$

in which I(ω) is a weighting function, ω is frequency, S(ω) is frequency resolved state of polarization, and T is a bit period.

The weighting function I(ω) may be an optical spectrum of the signal.

The tapping, separating, performing and computing steps may be carried out without interrupting operation of the network.

The optical channel separating step may include separating the optical channel using an optical bandpass filter.

The signal tapping step may include tapping the optical WDM signal using an optical coupler.

A and B may be predetermined constants.

The string length L may include a functional F[ ]:

$$L = F[\vec{S}(\omega)]$$

wherein functional F[ ] is a scalar function of a vector function, and is configured to minimize scatter in a graph of PMD-induced system penalty as a function of SOP string length.

The functional F[ ] may include string curvature so that:

$$L = \frac{\int I(\omega)|dS/d\omega|d\omega}{T\int I(\omega)d\omega} + \alpha \frac{\int I(\omega)|d^2S/d\omega^2|d\omega}{T^2\int I(\omega)d\omega}$$

in which α is a constant.

The present disclosure also supports a computer program product including computer executable code or computer executable instructions that, when executed, causes at least one computer to execute the performing and computing steps described herein.

The present disclosure also supports a system configured to execute the performing and computing steps described herein.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the spirit and scope of the present invention. It is therefore to be understood that within the scope of the appended claims and their equivalents, the invention may be practiced otherwise than as specifically described herein.

What is claimed is:

1. A method for determining a polarization mode dispersion (PMD) induced system penalty $\epsilon$ in an optical network carrying an optical wavelength division multiplexed (WDM) signal, the method comprising the steps of:
    tapping the optical WDM signal;
    separating an optical channel signal from the tapped optical WDM signal;
    performing a frequency-resolved state of polarization (SOP) measurement on the channel signal;
    in a computer, computing the polarization mode dispersion (PMD) induced system penalty $\epsilon$ as a function of L, wherein L is a weighted SOP string length based on the SOP measurement and expressed as:

$$L = \frac{\int I(\omega) |dS/d\omega| d\omega}{T \int I(\omega) d\omega}$$

wherein:
   I($\omega$) is a weighting function comprising an optical spectrum of the signal;
   $\omega$ is frequency;
   S($\omega$) is frequency resolved state of polarization; and
   T is a bit period; and
   outputting the PMD-induced system penalty $\epsilon$ to an application for estimating a channel quality.

2. The method of claim 1, wherein the step of performing a frequency-resolved SOP measurement includes:
    performing a string length measurement by a frequency-resolved SOP optical-domain measurement.

3. The method of claim 2, wherein the string length measurement includes:
    performing the string length measurement using heterodyne polarimetry.

4. The method of claim 1, further comprising:
    demultiplexing the optical WDM signal before the signal tapping step.

5. A computer program product comprising a non-transitory computer readable recording medium having recorded thereon a computer program comprising code means for, when executed on a computer, instructing said computer to control steps in a method for determining a polarization mode dispersion (PMD) induced system penalty $\epsilon$ in an optical network carrying an optical wavelength division multiplexed (WDM) signal, the method comprising the steps of:
    tapping the optical WDM signal;
    separating an optical channel signal from the tapped optical WDM signal;
    performing a frequency-resolved state of polarization (SOP) measurement on the channel signal;
    computing the polarization mode dispersion (PMD) induced system penalty $\epsilon$ as a function of L, wherein L is a weighted SOP string length based on the SOP measurement and expressed as:

$$L = \frac{\int I(\omega) |dS/d\omega| d\omega}{T \int I(\omega) d\omega}$$

wherein:
   I($\omega$) is a weighting function comprising an optical spectrum of the signal;
   $\omega$ is frequency;
   S($\omega$) is frequency resolved state of polarization; and
   T is a bit period; and
   outputting the PMD-induced system penalty $\epsilon$ to an application.

6. The computer program product of claim 5, wherein the step of performing a frequency-resolved SOP measurement includes:
    performing a string length measurement by a frequency-resolved SOP optical-domain measurement.

7. The computer program product of claim 6, wherein the string length measurement includes:
    performing the string length measurement using heterodyne polarimetry.

8. The computer program product of claim 5, wherein the method further comprises:
    demultiplexing the optical WDM signal before the signal tapping step.

* * * * *